(12) United States Patent
Cusmariu

(10) Patent No.: US 7,650,281 B1
(45) Date of Patent: Jan. 19, 2010

(54) METHOD OF COMPARING VOICE SIGNALS THAT REDUCES FALSE ALARMS

(75) Inventor: Adolf Cusmariu, Eldersburg, MD (US)

(73) Assignee: The U.S. Goverment as Represented By The Director, National Security Agency, Washington, DC (US)

( * ) Notice: Subject to any disclaimer, the term of this patent is extended or adjusted under 35 U.S.C. 154(b) by 721 days.

(21) Appl. No.: 11/545,922

(22) Filed: Oct. 11, 2006

(51) Int. Cl.
*G10L 15/06* (2006.01)

(52) U.S. Cl. ............... 704/243; 704/246; 704/273; 704/233; 704/275; 704/274; 455/411; 340/825.36; 340/426.25; 340/825.49

(58) Field of Classification Search ............ 704/274, 704/273, 243, 246, 275, 251, 233; 455/411; 340/825.36, 825.49, 426.25
See application file for complete search history.

(56) References Cited

U.S. PATENT DOCUMENTS

| | | | | |
|---|---|---|---|---|
| 4,040,013 A | * | 8/1977 | Carlson | 340/534 |
| 4,241,329 A | | 12/1980 | Bahler et al. | |
| 5,629,687 A | * | 5/1997 | Sutton et al. | 340/825.37 |
| 5,649,055 A | * | 7/1997 | Gupta et al. | 704/233 |
| 5,736,927 A | * | 4/1998 | Stebbins et al. | 340/506 |
| 5,842,161 A | * | 11/1998 | Cohrs et al. | 704/251 |
| 6,054,990 A | * | 4/2000 | Tran | 715/863 |
| 6,076,055 A | | 6/2000 | Bossemeyer, Jr. et al. | |
| 6,233,556 B1 | * | 5/2001 | Teunen et al. | 704/250 |
| 6,314,401 B1 | * | 11/2001 | Abbe et al. | 704/273 |
| 6,765,931 B1 | * | 7/2004 | Rabenko et al. | 370/493 |
| 6,931,375 B1 | | 8/2005 | Bossemeyer, Jr. et al. | |
| 7,278,028 B1 | * | 10/2007 | Hingoranee | 713/186 |
| 2004/0236573 A1 | * | 11/2004 | Sapeluk | 704/224 |
| 2005/0031097 A1 | * | 2/2005 | Rabenko et al. | 379/93.31 |
| 2005/0107070 A1 | * | 5/2005 | Geupel | 455/411 |
| 2005/0143996 A1 | | 6/2005 | Bossemeyer, Jr. et al. | |

* cited by examiner

*Primary Examiner*—Vijay B Chawan
(74) *Attorney, Agent, or Firm*—Robert D. Morelli

(57) ABSTRACT

A method of comparing voice samples to reduce false alarms by receiving a first voice sample, generating a model of the first voice sample, reordering the first voice sample, generating a model of the reordered first voice sample; receiving a second voice sample; generating a model of the second voice sample; reordering the second voice sample, generating a model of the reordered second voice sample, comparing at least one pairings of the models, and determining if the first voice sample matches the second voice sample if the model comparisons are within a user-definable threshold.

16 Claims, 2 Drawing Sheets

METHOD OF COMPARING VOICE SIGNALS THAT REDUCES FALSE ALARMS

FIELD OF INVENTION

The present invention relates, in general, to data processing for a specific application and, in particular, to digital audio data processing.

BACKGROUND OF THE INVENTION

Voice comparisons are used in speaker identification, recognition, authentication, and verification. False alarms occur in these methods when two voice samples that are different are compared and determined to be identical. False alarms reduce the performance of automated voice comparison methods. There is a need for a voice comparison method that reduces false alarms. The present invention is such a method.

U.S. Pat. No. 4,241,329, entitled "CONTINUOUS SPEECH RECOGNITION METHOD FOR IMPROVING FALSE ALARM RATES," discloses a method of recognizing keywords in continuous speech with improved false alarm rates by characterizing each keyword to be recognized by a template, selecting a sequence of patterns from a signal, comparing the pattern to the templates, determining which template matches the pattern, and applying a prosodic test to determine if the determination is a false alarm or not. The present invention does not characterize keywords with templates, compare patterns to templates, or apply a prosodic test to determine false alarms as does U.S. Pat. No. 4,241,329. U.S. Pat. No. 4,241,329 is hereby incorporated by reference into the specification of the present invention.

U.S. Pat. Nos. 6,076,055 and 6,931,375 and U.S. Pat. Appl. No. 20050143996, each entitled "SPEAKER VERIFICATION METHOD," each disclose a method of verifying that a speaker is who the speaker claims to be by generating a code book, acquiring a number of training utterances from each of a number of speakers, receiving a number of test utterances, comparing the test utterances to the training utterances to form a number of decisions, weighting each decision, and combining the weighted decisions to form a verification decision. The present invention does not generate a code book, acquire a number of training utterances from each of a number of speakers, weight decisions, or combine weighted decisions to form a verification decision as does U.S. Pat. Nos. 6,076,055 and 6,931,375 and U.S. Pat. Appl. No. 20050143996. U.S. Pat. Nos. 6,076,055 and 6,931,375 and U.S. Pat. Appl. No. 20050143996 are hereby incorporated by reference into the specification of the present invention.

SUMMARY OF THE INVENTION

It is an object of the present invention to reduce false alarms in voice comparisons.

It is another object of the present invention to reduce false alarms in voice comparisons by reordering the voice samples being compared.

It is another object of the present invention to reduce false alarms in voice comparisons by reordering the voice samples being compared and conducting at least one comparison selected from the group of comparisons consisting of comparing a first signal as received to a second signal as received, comparing a first signal as received to a second signal which is reordered, and comparing a first signal which is reordered to a second signal as received.

The present invention is a method of comparing voice samples to reduce false alarms.

The first step of the method is receiving a first voice sample.

The second step of the method is generating a first model of the first voice sample.

The third step of the method is reordering the first voice sample.

The fourth step of the method is generating a second model of the reordered first voice sample.

The fifth step of the method is receiving a second voice sample.

The sixth step of the method is generating a third model of the second voice sample.

The seventh step of the method is reordering the second voice sample.

The eighth step of the method is generating a fourth model of the reordered second voice sample.

The ninth step of the method is comparing at least one pairing of the models.

The tenth step of the method is determining if the first voice sample matches the second voice sample if the model comparisons are within a user-definable threshold.

DETAILED DESCRIPTION

The present invention is a method of comparing voice samples to reduce false alarms.

Figure 1:
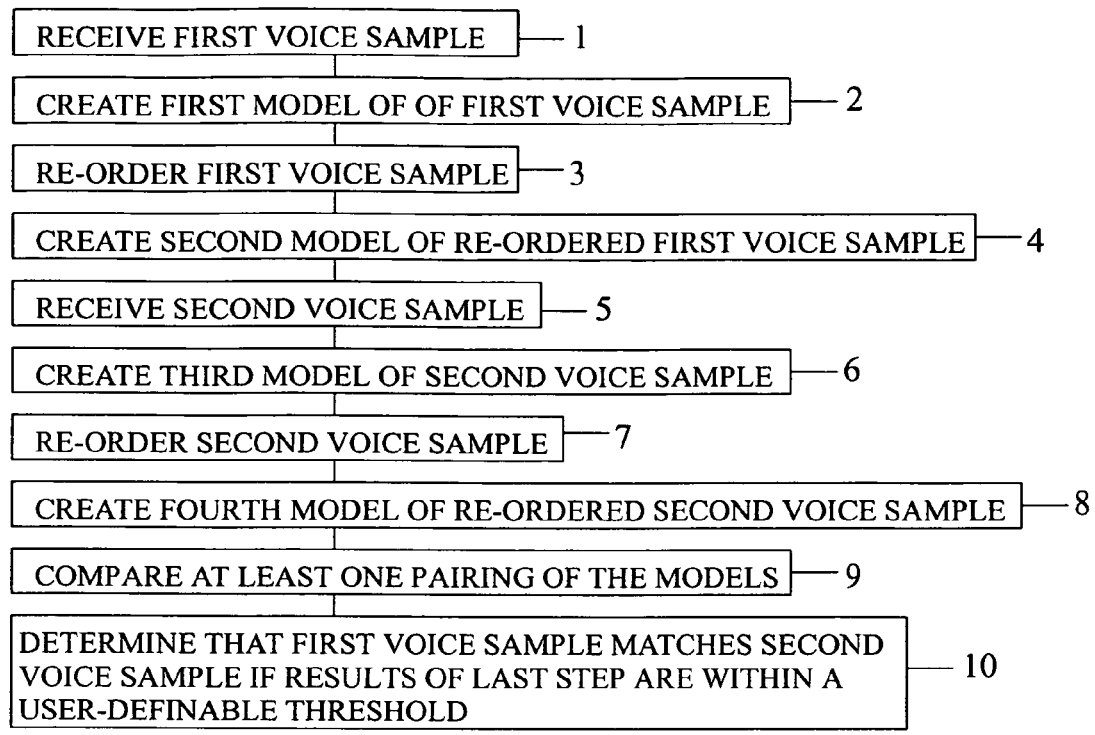
FIG. 1 is a flowchart of the present invention.

FIG. 1 is a flowchart of the present invention.

The first step 1 of the method is receiving a first voice sample. In the preferred embodiment, the first voice sample is received in an analog format. In an alternative embodiment, the first voice sample is received in a digital format. If the first voice sample is received in an analog format then the method of the present invention includes the step of digitizing the analog first voice sample.

The second step 2 of the method is generating a model of the first voice sample. Example of models of voice include spectral models, cepstral models, linear predictive coding (LPC), sinusoidal models, Hidden Markov models, and so on.

The third step 3 of the method is reordering the first voice sample using a reordering method selected from the group of reordering methods consisting of time-reversal, segmental rearrangement, and a combination thereof. Prior art method rely only on forwardly digitized recordings for model building and comparison, whereas the present invention relies on both forwardly digitized recordings and non-forwardly digitized recordings. A time-reversal of a digitally sampled voice recording is the recording reordered backwards. A segmented re-arrangement of the digitally sampled voice recording is first a determination of where the segments are in the recording, where the segments include phonemes, words, utterances, sentences, or any other acoustical or semantic grouping, and second a user-definable re-arrangement of the segments. Time-reversal and segmented re-arrangement may be combined to produce additional candidate sequences for voice model generation and comparison.

The fourth step 4 of the method is generating a model of the reordered first voice sample. A voice models generated from acoustically reordered digital voice recordings enhance the robustness of voice authentication by forcing an additional test derived from the same recording, yet containing novel features for validation.

The fifth step 5 of the method is receiving a second voice sample. In the preferred embodiment, the second voice sample is received in an analog format. In an alternative embodiment, the second voice sample is received in a digital format. If the second voice sample is received in an analog format then the method of the present invention includes the step of digitizing the analog second voice sample.

The sixth step 6 of the method is generating a model of the second voice sample.

The seventh step 7 of the method is reordering the second voice sample using a reordering method selected from the group of reordering methods consisting of time-reversal, segmental rearrangement, and a combination thereof.

The eighth step 8 of the method is generating a model of the reordered second voice sample.

The ninth step 9 of the method is comparing at least one pairing of the models. In the preferred embodiment, the pairings include the model of the first voice sample and the model of the second voice sample, the model of the first voice sample and the model of the reordered second voice sample, the model of the reordered first voice sample and the model of the second voice sample, and the model of the first reordered voice sample and the model of the reordered second voice sample.

The tenth step 10 of the method is determining that the first voice sample matches the second voice sample if the model comparisons are within a user-definable threshold.

Figure 2:
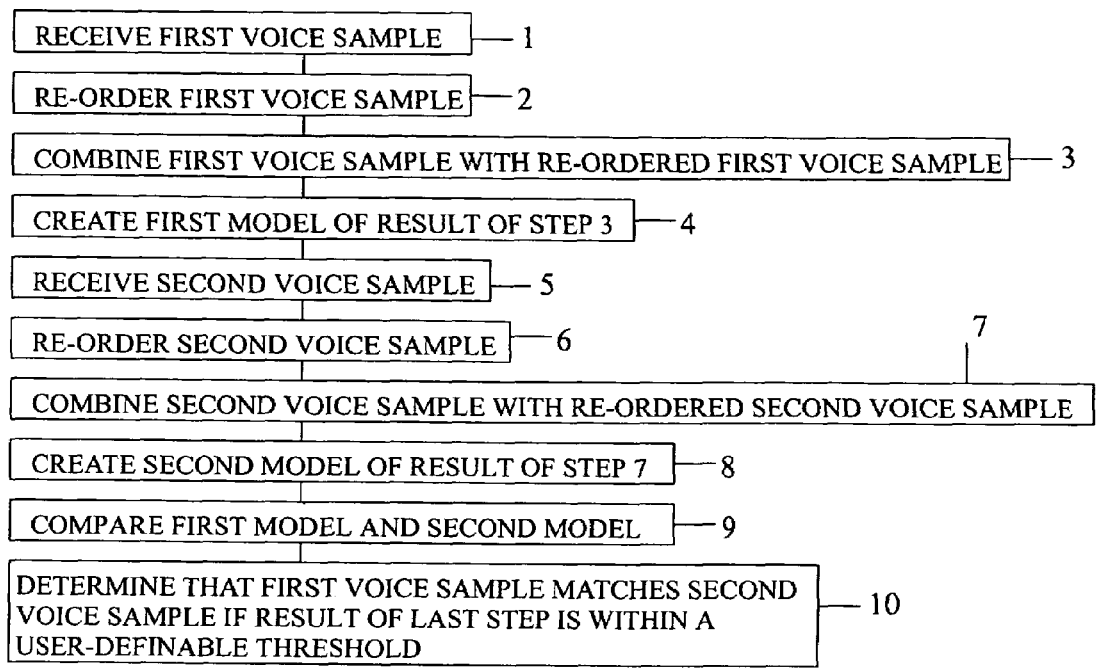
FIG. 2 is a flowchart of an alternate embodiment of the present invention.

FIG. 2 is a flowchart of an alternate embodiment of the present invention.

The first step 21 of the alternative method is receiving a first voice sample. In the preferred embodiment, the first voice sample is received in an analog format. In an alternative embodiment, the first voice sample is received in a digital format. If the first voice sample is received in an analog format then the method of the present invention includes the step of digitizing the analog first voice sample.

The second step 22 of the alternative method is reordering the first voice sample using a reordering method selected from the group of reordering methods consisting of time-reversal, segmental rearrangement, and a combination thereof.

The third step 23 of the alternative method is combining the results of the first step 21 and the second step 22. In the preferred embodiment, the combination method is to append the result of the second step 22 to the result of the first step 21. However, any other suitable combination method may be employed.

The fourth step 24 of the alternative method is generating a model of the result of the third step 23.

The fifth step 25 of the alternative method is receiving a second voice sample. In the preferred embodiment, the second voice sample is received in an analog format. In an alternative embodiment, the second voice sample is received in a digital format. If the second voice sample is received in an analog format then the method of the present invention includes the step of digitizing the analog second voice sample.

The sixth step 26 of the alternative method is reordering the second voice sample using a reordering method selected from the group of reordering methods consisting of time-reversal, segmental rearrangement, and a combination thereof.

The seventh step 27 of the alternative method is combining the results of the fifth step 25 and the sixth step 26. In the preferred embodiment, the combination method is appending the result of the sixth step 26 to the result of the fifth step 25. However, any other suitable combination method may be employed.

The eighth step 28 of the alternative method is generating a model of the result of the seventh step 27.

The ninth step 29 of the alternative method is comparing the results of the fourth step 24 and the eighth step 28.

The tenth step 30 of the alternative method is determining that the first voice sample matches the second voice sample if the result of the ninth step 29 is within a user-definable threshold.

What is claimed is:

1. A method of comparing voice samples to reduce false alarms:
    a) receiving a first voice sample;
    b) generating a first model of the first voice sample;
    c) reordering the first voice sample using a reordering method selected from the group of reordering methods consisting of time-reversal, segmental rearrangement, and a combination thereof;
    d) generating a second model of the result of step (c);
    e) receiving a second voice sample;
    f) generating a third model of the second voice sample;
    g) reordering the second voice sample using a reordering method selected from the group of reordering methods consisting of time-reversal, segmental rearrangement, and a combination thereof;
    h) generating a fourth model of the result of step (g);
    i) comparing at least one pair of models selected from the group of model pairs consisting of the first model and the third model, the first model and the fourth model, the second model and the third model, and the second model and the fourth model; and
    j) determining that the first voice sample matches the second voice sample if the results of step (i) are within a user-definable threshold.

2. The method of claim 1, wherein the step of receiving a first voice sample is comprised of the step of receiving a first voice sample in an analog format.

3. The method of claim 2, further including the step of digitizing the first voice sample.

4. The method of claim 2, further including the step of digitizing the first voice sample.

5. The method of claim 4, wherein the step of receiving a second voice sample is comprised of the step of receiving a first voice sample in an analog format.

6. The method of claim 5, further including the step of digitizing the first voice sample.

7. The method of claim 1, wherein the step of receiving a second voice sample is comprised of the step of receiving a first voice sample in an analog format.

8. A method of comparing voice samples to reduce false alarms:
    a) receiving a first voice sample;
    b) reordering the first voice sample using a reordering method selected from the group of reordering methods consisting of time-reversal, segmental rearrangement, and a combination thereof;
    c) combining the results of step (a) and step (b);
    d) generating a first model of the result of step (c);
    e) receiving a second voice sample;
    f) reordering the second voice sample using a reordering method selected from the group of reordering methods consisting of time-reversal, segmental rearrangement, and a combination thereof;
    g) combining the results of step (e) and step (f);
    h) generating a second model of the result of step (g);
    i) comparing the first model and the second model; and j) determining that the first voice sample matches the second voice sample if the result of step (i) is within a user-definable threshold.

9. The method of claim 8, wherein the step of receiving a first voice sample is comprised of the step of receiving a first voice sample in an analog format.

10. The method of claim 9, further including the step of digitizing the first voice sample.

11. The method of claim 9, further including the step of digitizing the first voice sample.

12. The method of claim 10, wherein the step of receiving a second voice sample is comprised of the step of receiving a first voice sample in an analog format.

13. The method of claim 8, wherein the step of receiving a second voice sample is comprised of the step of receiving a first voice sample in an analog format.

14. The method of claim 8, wherein the step of combining the results of step (e) and step comprised of the step of appending the result of step (f) to the result of step (e).

15. The method of claim 14, further including the step of digitizing the first voice sample.

16. The method of claim 15, wherein the step of combining the results of step (e) and step (f) is comprised of the step of appending the result of step (f) to the result of step (e).

* * * * *